(12) United States Patent
Hill

(10) Patent No.: US 6,945,342 B1
(45) Date of Patent: Sep. 20, 2005

(54) TRACK DRIVE UNDERCARRIAGE DEVICE, KIT AND METHOD

(76) Inventor: John D. Hill, 205 S. Evans, Saratoga, IN (US) 47382

( * ) Notice: Subject to any disclaimer, the term of this patent is extended or adjusted under 35 U.S.C. 154(b) by 0 days.

(21) Appl. No.: 10/698,281

(22) Filed: Nov. 3, 2003

(51) Int. Cl.$^7$ ............................................. B62D 55/00
(52) U.S. Cl. ...................... 180/9.54; 180/9.28; 180/9.1
(58) Field of Search ........................ 180/9.1, 9.26–9.28, 180/9.3, 9.46, 9.5, 9.52, 9.54

(56) References Cited

U.S. PATENT DOCUMENTS

| | | | | |
|---|---|---|---|---|
| 3,774,708 | A | * | 11/1973 | Purcell et al. ................ 180/9.5 |
| 4,230,199 | A | * | 10/1980 | Stedman ...................... 180/9.1 |
| 4,560,018 | A | * | 12/1985 | Satzler ........................ 180/9.1 |
| 4,874,052 | A | * | 10/1989 | Purcell et al. ................ 180/9.1 |
| 5,975,226 | A | * | 11/1999 | Matsumoto et al. ........ 180/9.34 |
| 6,132,133 | A | * | 10/2000 | Muro et al. .................. 404/102 |
| 6,182,777 | B1 | * | 2/2001 | Kautsch ....................... 180/9.48 |
| 6,318,484 | B2 | * | 11/2001 | Lykken et al. .............. 180/9.48 |

\* cited by examiner

*Primary Examiner*—Lesley D. Morris
*Assistant Examiner*—L. Lum

(57) ABSTRACT

A track drive undercarriage device, a kit for the device, and a method of using the same are described attached to a chassis of a heavy construction work vehicle for operationally connected to a transmission and drive shaft of the construction vehicle. The device is operationally attached to the vehicle for providing increased the traction and stability of the heavy construction work vehicle when maneuvering the vehicle off-road. The device includes the interconnected elements of: a pair of support braces, a base plate, four shock absorbers, four axles, a pair of torque bars, and four spindles. The kit includes the unconnected components of the device. The method of using includes the steps of acquiring, adjoining, affixing, connecting, joining, obtaining, procuring, receiving, securing, and wrapping.

1 Claim, 4 Drawing Sheets

TRACK DRIVE UNDERCARRIAGE DEVICE, KIT AND METHOD

FIELD OF THE INVENTION

The present invention relates to heavy construction work vehicles, more particularly, to a track drive undercarriage device, a kit, and a method of using same for providing a means for increased traction and stability to the heavy construction work vehicle when maneuvering the vehicle off-road.

BACKGROUND OF THE INVENTION

Commercially available earth working and transport machines are generally mounted on endless tracks or pneumatic tires for locomotion purposes. Track-type machines, such as conventional two-track crawler tractors, presently comprise the most compact, powerful and all- purpose pulling nd pushing machines available. However, such machines inherently exhibit certain limitations and operating deficiencies such as speed limitations and operating deficiencies such as speed limitations, vibration and shock-absorbing limitations, numerous, complex and massive components and high-noise level. Therefore, continued improvements made to such crawler tractors primarily intended for increasing the traction, stability and safety capabilities thereof, have comprised the redesign of existing components or development of various four track-type machines.

A wide variety of construction machines is currently available on the commercial market and an even larger number of these types of devices are known in the art of construction machines, for example, the tractor tread disclosed by Boltman in U.S. Pat. No. 2,470,801; the cushioned track disclosed by Peterson in U.S. Pat. No. 3,601,212; the track and drive sprocket for track-laying disclosed by Gibson in U.S. Pat. No. 3,561,825; the close coupled frame steered all crawler tractor disclosed by Kowalik in U.S. Pat. No. 3,741,331; the frictional driven belted work vehicle disclosed by Graway et al. in U.S. Pat. No. RE37,174; the backhoe disclosed by Kusunoki et al. in U.S. Pat. No. D354,497; and the work machine having endless ground engaging drive belts disclosed by Bastian et al. in U.S. Pat. No. D364,879.

While all of the above-described devices fulfill their respective, particular objectives and requirements, the aforementioned patents do not describe a heavy construction work vehicle having the interconnected elements of: a pair of support braces, a base plate, four shock absorbers, four axles, a pair of torque bars, and four spindles. This combination of elements would specifically match the user's particular individual needs of making it possible to use the device attached to a chassis of a heavy Construction work vehicle for providing a means for increased traction and an enhanced means for stabilization of the heavy construction work vehicle when maneuvering the vehicle off-road. The above-described patents make no provision for a heavy construction work vehicle having the interconnected elements of: a pair of support braces, a base plate, four shock absorbers, four axles, a pair of torque bars, and four spindles.

Therefore, a need exists for a new and improved heavy construction work vehicle having the interconnected elements of: a pair of support braces, a base plate, four shock absorbers, four axles, a pair of torque bars, and four spindles. This combination of elements makes it possible to use the device attached to a chassis of a heavy construction work vehicle for providing a means for increased traction and an enhanced means for stabilization of the heavy construction work vehicle when maneuvering the vehicle off-road. In this respect, the heavy construction work vehicle according to the present invention substantially departs from the conventional concepts and designs of the prior art, and in doing so provides an apparatus primarily developed for the purpose of providing a means for increased traction and an enhanced means for stabilization of the heavy construction work vehicle when maneuvering the vehicle off-road.

SUMMARY OF THE INVENTION

The present device, kit and method of using, according to the principles of the present invention, overcomes the shortcomings of the prior art by providing a novel and nonobvious heavy construction work vehicle, kit and method of using the same. The device is operationally attached to the vehicle for providing increased the traction and stability of the heavy construction work vehicle when maneuvering the vehicle off-road. The device includes the interconnected elements of: a pair of support braces, a base plate, four shock absorbers, four axles, a pair of torque bars, and four spindles. The kit includes the unconnected components of the device. The method of using includes the steps of acquiring, adjoining, affixing, connecting, joining, obtaining, procuring, receiving, securing, and wrapping.

In view of the foregoing disadvantages inherent in the known type heavy construction work vehicle devices now present in the prior art, the present invention provides an improved heavy construction work vehicle, which will be described subsequently in great detail, is to provide a new and improved heavy construction work vehicle which is not anticipated, rendered obvious, suggested, or even implied by the prior art, either alone or in any combination thereof.

To attain this, the present invention essentially comprises the interconnected elements of: a pair of support braces, a base plate, four shock absorbers, four axles, a pair of torque bars, and four spindles.

There has thus been outlined, rather broadly, the more important features of the invention 5 in order that the detailed description thereof that follows may be better understood, and in order that the present contribution of the art may be better appreciated.

The invention may also include four wheel bearings 32, four cogwheels 34, and a pair of drive wheels 36. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved heavy construction work vehicle that has all the advantages of the prior art heavy construction work vehicle and none of the disadvantages.

It is another object of the present invention to provide a new and improved heavy construction work vehicle that may be easily and efficiently manufactured and marketed.

An even further object of the present invention is to provide a new and improved heavy construction work vehicle that has a low cost of manufacture with regard to both materials and labor, and which accordingly is then susceptible of low prices of sale to the consuming public, thereby making such multipurpose storage unit and system economically available to the buying public.

Still another object of the present invention is to provide a new heavy construction work vehicle that provides in the apparatuses and methods of the prior art some of the advantages thereof, while simultaneously overcoming some of the disadvantages normally associated therewith.

Even still another object of the present invention is to provide a heavy construction work vehicle having the interconnected elements of: a pair of support braces, a base plate, four shock absorbers, four axles, a pair of torque bars, and four spindles. This combination of elements makes it possible to use the device attached to a chassis of a heavy construction work vehicle for providing a means for increased traction and enhanced means for stability of the heavy construction work vehicle when maneuvering the vehicle off-road.

Still another object of the present invention is to provide a kit comprising the unassembled components of the device.

Lastly, it is an object of the present invention to provide a new and improved method of using comprising the steps of acquiring, adjoining, affixing, connecting, joining, obtaining, procuring, receiving, securing, and wrapping.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way. These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and description matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENT

Figure 1:
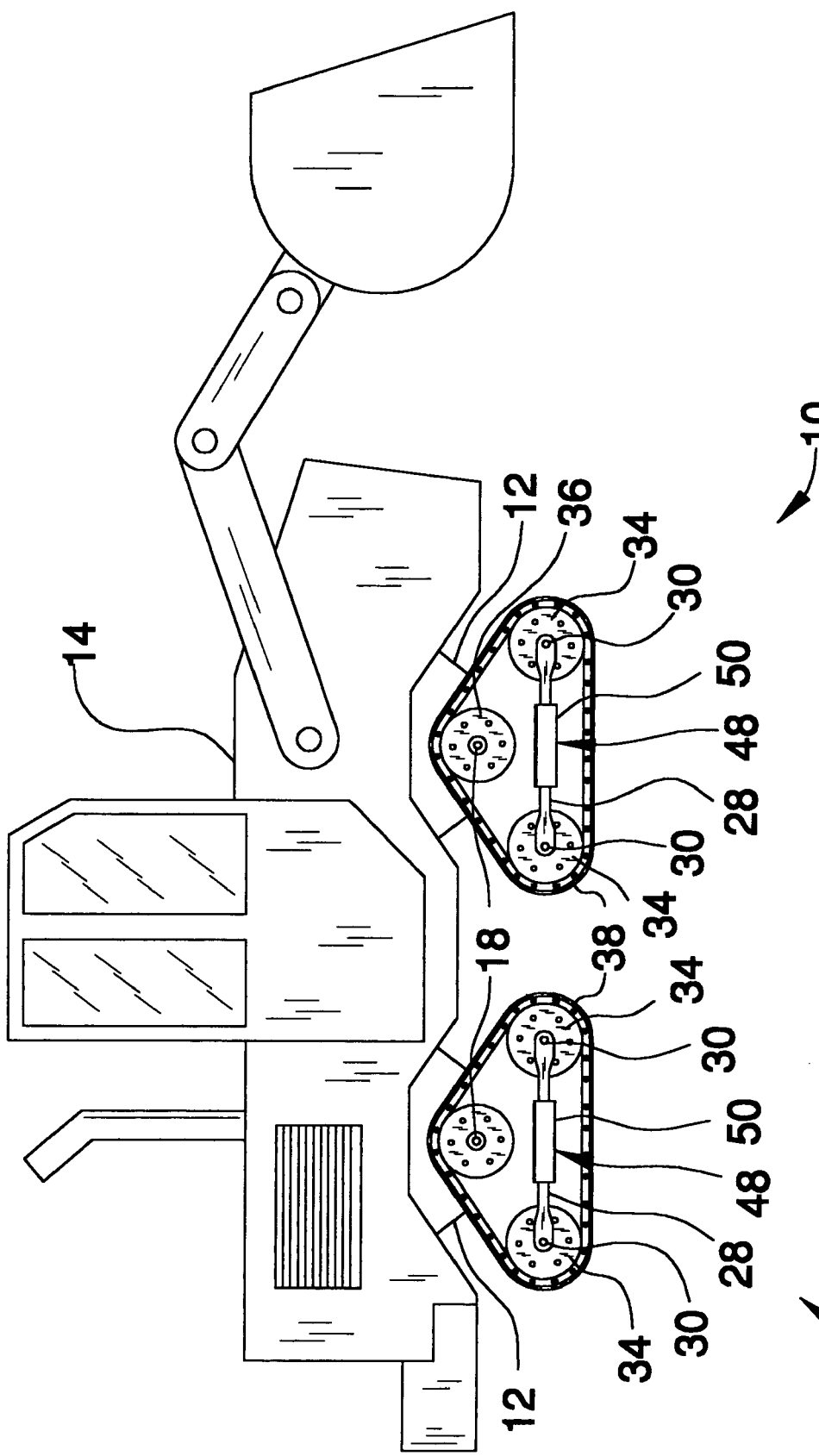
FIG. 1 is a side view of an preferred embodiment of the track drive undercarriage device constructed in accordance with the principles of the present invention.

Referring now to the drawings, and in particular FIGS. 1 to 5 thereof, one preferred embodiment of the present invention is shown and generally designated by the reference numeral 10. One preferred embodiment of a track drive undercarriage device 10 attached to a chassis 12 of a heavy construction vehicle 14 and operationally connected to a transmission 16 and drive shaft 18 of the construction vehicle 14, said device 10 comprising: a pair of support braces 54; a base plate 22; four shock absorbers 24; four axles 26; a pair of torque bars 28; and four spindles 30. The pair of support braces 54 is attached to the construction vehicle 14. The base plate 22 is attached to said support braces 54. The four shock absorbers 24 are attached to said base plate 22. The four axles 26 are attached to said four shock absorbers 24, each axle 26 having a distal end and a proximate end, the proximate end of each axle 26 is attached to one of said four shock absorbers 24. The pair of torque bars 28 is attached to said four axles 26, each torque bar 28 having two opposite ends, each opposite end of each torque bar 28 is attached to the distal end of one of said four axles 26. The four spindles 30 are attached to said four axles 26, each spindle 30 is attached to the distal end of one of said four axles 26.

An optional four wheel bearings 32 may be added to the device 10 wherein the four wheel bearings 32 are attached to said four spindles 30, each wheel bearing 32 is attached to one of said four spindles 30.

An optional four cogwheels 34 may be added to the device 10 wherein the four cogwheels 34 are attached to said four wheel bearings 32 wherein each cogwheel 34 is attached to one wheel bearing 32 of said four wheel bearings 32.

An optional pair of drive wheels 36 may be added to the device 10 wherein the pair of drive wheels 36 are attached to the drive shaft 18 of the construction vehicle 14, each drive wheel 36 is attached to an opposing end of the drive shaft 18 whereby each drive wheel 36 is operatively attached to the transmission 16 of the construction vehicle 14.

An optional pair of drive wheels 36 may be added to the device 10 wherein the pair of drive wheels 36 are attached to the drive shaft 18 of the construction vehicle 14, each drive wheel 36 is attached to an opposing end of the drive shaft 18 whereby each drive wheel 36 is operatively attached to the transmission 16 of the construction vehicle 14.

An optional pair of endless belts 38 may be added to the device 10 wherein the pair of endless belts 38 are operatively attached around said cogwheels 34 and said drive wheels 36.

Each shock absorber 24 may comprise any commercially available shock absorber. One preferred configuration of the shock absorber 24 comprises: a U-brace 40 attached to said base plate 22; a horizontal cross bar 42 attached to said U-brace 40; a pair of horizontal springs 44 attached to said U-brace 40 and attached to said horizontal cross bar 42; and a vertical spring 46 attached to said U-brace 40 and attached to said U-brace 40, wherein the proximate end of each axle 26 is attached to said horizontal cross bar 42, said pair of horizontal springs 44 and said vertical spring 46 of one of said four shock absorbers 24.

Each torque bar 28 may comprise any commercially available torque bar. One preferred configuration of the torque bar 28 comprises a compression. shock system 48 attached to a middle portion of each torque bar 28, wherein said compression shock system 48 comprises a housing assembly 50 and a compression spring 52 attached to said housing assembly 50.

The construction vehicle 14 may be any commercially available vehicle. Some preferred configurations of the construction vehicle 14 are selected from the group consisting of a bulldozer, a tractor, a backhoe, a military tank, and a military troop carrier.

One preferred embodiment of a kit for a track drive undercarriage device 10 for attachment to a chassis 12 of a heavy construction vehicle 14 and operationally connectable to a transmission 16 and drive shaft 18 of the construction vehicle 14, said kit comprising: a pair of support braces 54 attachable to the construction vehicle 14; a base plate 22 attached to said support braces 54; four shock absorbers 24 attached to said base plate 22; four axles 26 attached to said four shock absorbers 24, each axle 26 having a distal end and a proximate end, the proximate end of each axle 26 is attached to one of each shock absorber 24; a pair of torque bars 28 attached to said four axles 26, each torque bar 28 having two opposite ends, each opposite end of each torque bar 28 is attached to the distal end of each axle 26; and four spindles 30 attached to said four axles 26, each spindle 30 is attached to the distal end of each axle 26.

An optional four wheel bearings 32 may be added to the kit in which the four wheel bearings 32 are attachable to said four spindles 30, each wheel bearing 32 is attachable to one of said four spindles 30.

An optional four cogwheels 34 may be added to the kit in which each cogwheel 34 is individually attachable to separate wheel bearings 32.

An optional pair of drive wheels 36 may be added to the kit in which the pair of drive wheels 36 are attachable to the drive shaft 18 of the construction vehicle 14, each drive wheel 36 is attachable to opposing ends of the drive shaft 18 whereby each drive wheel 36 is operatively attachable to the transmission 16 of the construction vehicle 14.

An optional two endless belts 38 may be added to the kit in which the two endless belts 38 are operatively attachable around said cogwheels 34 and said drive wheels 36.

One preferred method of using a kit for attaching a track drive undercarriage device 10 to a chassis 12 of a heavy construction vehicle 14, said method comprising the steps of: acquiring, adjoining, affixing, connecting, joining, obtaining, procuring, receiving, securing, and wrapping.

The obtaining step comprises obtaining the kit comprising: a pair of support braces 54 attachable to the construction vehicle 14; a base plate 22 attached to said support braces 54; four shock absorbers 24 attached to said base plate 22; four axles 26 attached to said four shock absorbers 24, each axle 26 having a distal end and a proximate end, the proximate end of each axle 26 is attached to one of each shock absorber 24; a pair of torque bars 28 attached to said four axles 26, each torque bar 28 having two opposite ends, each opposite end of each torque bar 28 is attached to the distal end of each axle 26; and four spindles 30 attached to said four axles 26, each spindle 30 is attached to the distal end of each axle 26. The step comprises affixing the base plate 22 to the chassis 12 of the construction vehicle 14. The acquiring step comprises acquiring four wheel bearings 32 attachable to the four spindles 30. The adjoining step comprises adjoining operationally each wheel bearing 32 to each spindle 30. The securing step comprises securing four cogwheels 34. The connecting step comprises connecting operationally each cogwheel 34 to each wheel bearing 32. The receiving step comprises receiving a pair of drive wheels 36. The joining step comprises joining operationally each drive wheel 36 to the drive shaft 18 of the construction vehicle 14. The procuring step comprises procuring a pair of endless belts 38. The wrapping step comprises wrapping operationally the endless belts 38 around the cogwheels 34 and the drive wheels 36.

Referring now to FIG. 1 which depicts a side view of a two track drive undercarriage devices 10 attached to a chassis 12 of a heavy construction work vehicle 14. Each device 10 is shown having a drive shaft 18, a torque bar 28, two spindles 30, two cogwheels 34, a drive wheel 36, and an endless belt 38. Each torque bar 28 is also shown to have a compression shock system 48 having a housing assembly 50 mounted in a middle portion of each torque bar 28.

Figure 2:
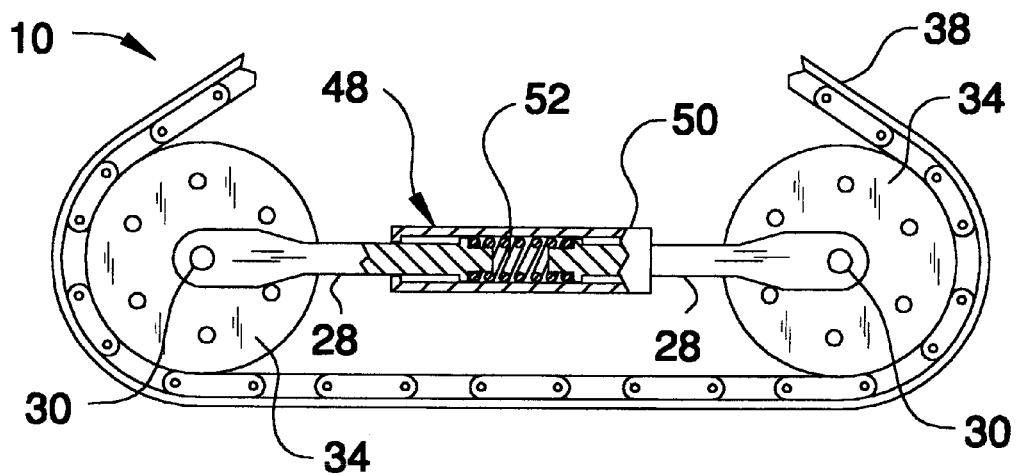
FIG. 2 is a partial side view of a preferred embodiment of the track drive undercarriage device of the present invention.

Referring now to FIG. 2 which depicts a partial side view of a preferred embodiment of the track drive undercarriage device 10 showing two spindles 30, two cogwheels 34, an endless belt 38 and a torque bar 28, in which the torque bar 28 is partially transparently shown to have a compression shock system 48 having a housing assembly 50 mounted in a middle portion of each torque bar 28 and a compression spring 52 attached to the housing assembly 50.

Figure 3:
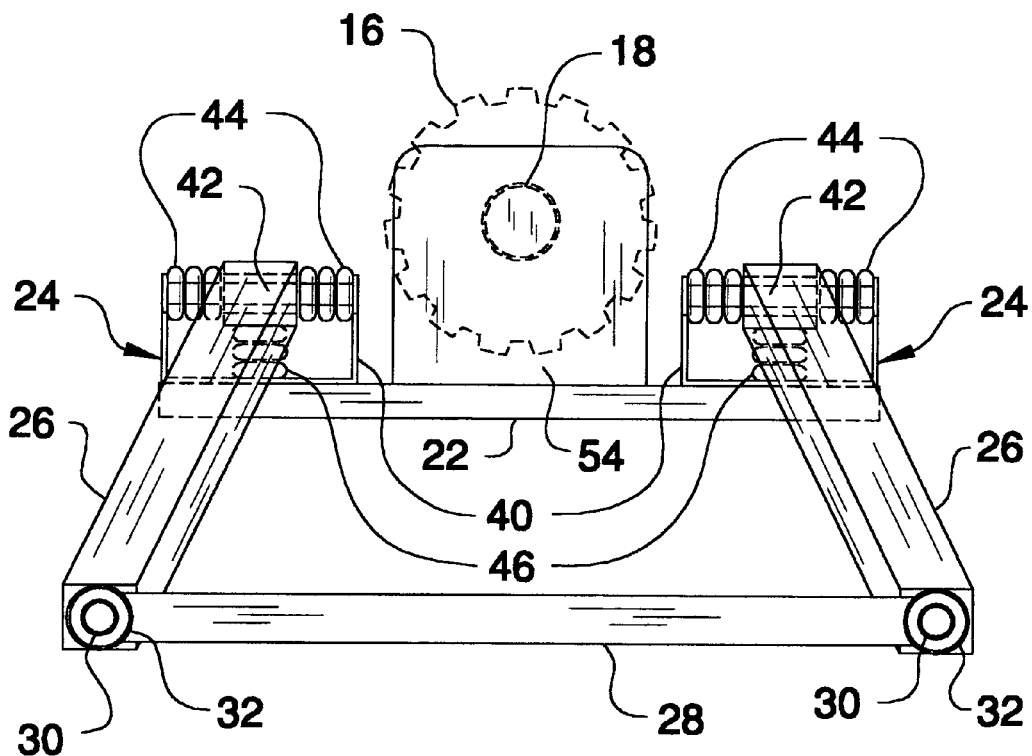
FIG. 3 is a partial side view of a preferred embodiment of the track drive undercarriage device of the present invention.

Referring now to FIG. 3 which depicts a partial side view of a preferred embodiment of the track drive undercarriage device having a drive gear 16, a drive shaft 18, a support brace 54, a base plate 22, two shock absorbers 24, two axles 26, a torque bar 28, and two spindles 30. The drive shaft 18 is shown attached to the drive gear 16. The support brace 54 is shown attached to the vehicle 14. The base plate 22 is shown attached to the support brace 54. The two shock absorbers 24 are shown attached to the base plate 22. The two axles 26 are shown attached to the two shock absorbers 24, in which the proximate end of each axle 26 is shown attached to one of the two shock absorbers 24. The torque bar 28 is shown attached to the two axles 26, in which each opposite end of the torque bar 28 is shown attached to the distal end of one of the two axles 26. The two spindles 30 are shown attached to the four axles 26, in which each spindle 30 is shown attached to the distal end of one of the two axles 26. Each shock absorber 24 is shown comprising a U-brace 40, a horizontal cross bar 42, a pair of horizontal springs 44, and a vertical spring 46. The U-brace 40 is shown attached to the base plate 22. The horizontal cross bar 42 is shown attached to the U-brace 40. The pair of horizontal springs 44 is shown attached to the U-brace 40 and is shown attached to the horizontal cross bar 42. The vertical spring 46 is shown attached to the U-brace 40 and is shown attached to the U-brace 40, wherein the proximate end of each axle 26 is shown attached to the horizontal cross bar 42, the pair of horizontal springs 44 and the vertical spring 46 of one of the two shock absorbers 24.

Figure 4:
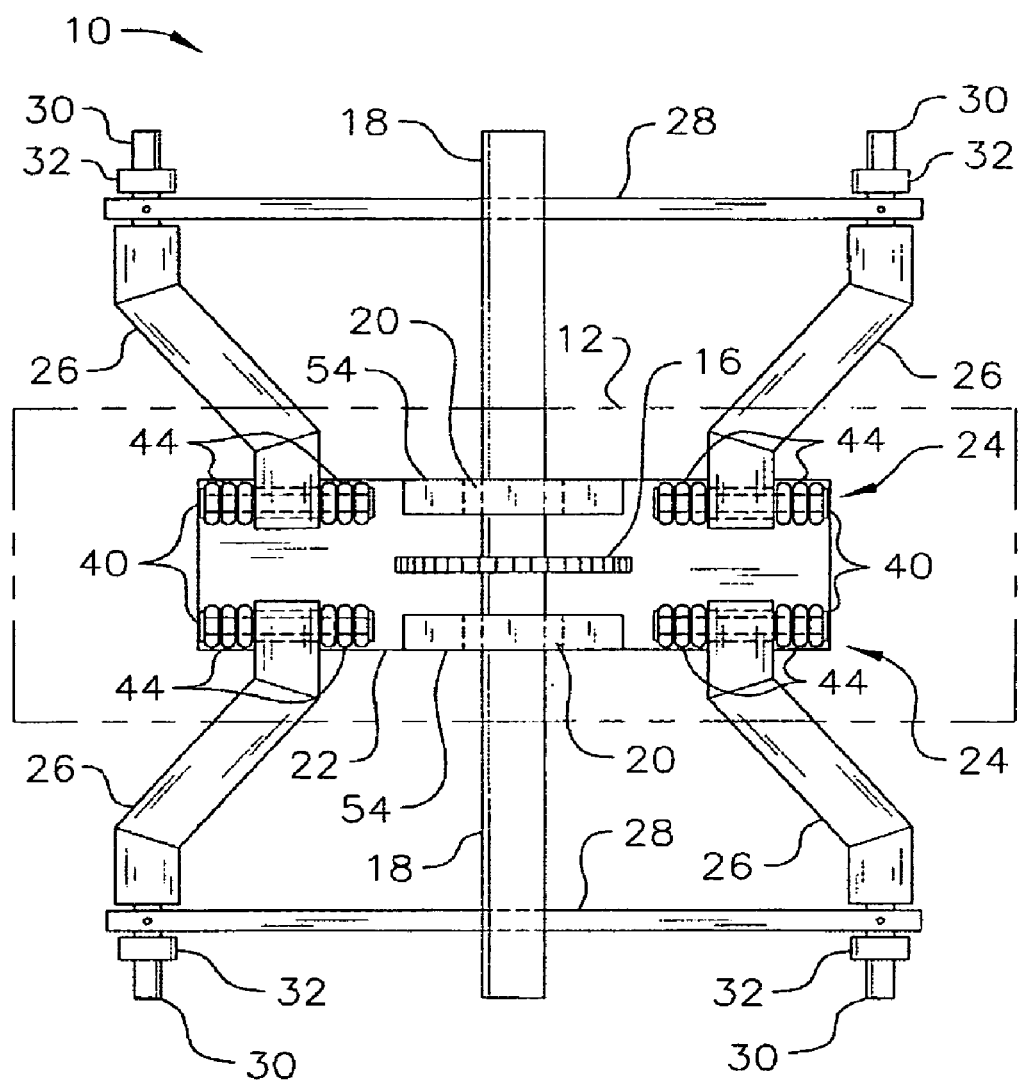
FIG. 4 is a top view of a preferred embodiment of the track drive undercarriage device of the present invention.

Referring now to FIG. 4 which depicts a top view of a preferred embodiment of the track drive undercarriage device 10 underneath a chassis 12. The device is shown having a drive gear 16, a drive shaft 18, a pair of support braces 54, a base plate 22, four shock absorbers 24, four axles 26, a pair of torque bars 28, four spindles 30 and four wheel bearings 32. The drive gear 16 is shown operationally connected to a transmission of the work vehicle 14. The drive shaft 18 is shown attached to the drive gear 16, wherein the drive shaft 18 is shown having two opposing ends. The pair of support braces 54 is shown attached to the vehicle 14. The base plate 22 is shown attached to the support braces 54, wherein the base plate 22 also shown underneath the chassis 12. The four shock absorbers 24 are shown attached to the base plate 22. The four axles 26 are shown attached to the four shock absorbers 24, wherein each axle 26 is shown having a distal end and a proximate end, in which the proximate end of each axle 26 is shown attached to one of the four shock absorbers 24. The pair of torque bars 28 is shown attached to the four axles 26, in which each torque bar 28 is shown having two opposite ends, wherein each opposite end of each torque bar 28 is shown attached to the distal end of one of the four axles 26. The four spindles 30 are shown attached to the four axles 26, each spindle 30 is shown attached to the distal end of one of the four axles 26. The four wheel bearings 32 are shown attached to the four spindles 30, in which each wheel bearing 32 is shown attached to one of the four spindles 30. Each shock absorber 24 is shown comprising a U-brace 40, a horizontal cross bar 42, and a pair of horizontal springs 44. The U-brace 40 is shown attached to the base plate 22. The horizontal cross bar 42 is shown attached to the U-brace 40. The pair of horizontal springs 44 is shown attached to the U-brace 40 and is shown attached to the horizontal cross bar 42.

Figure 5:
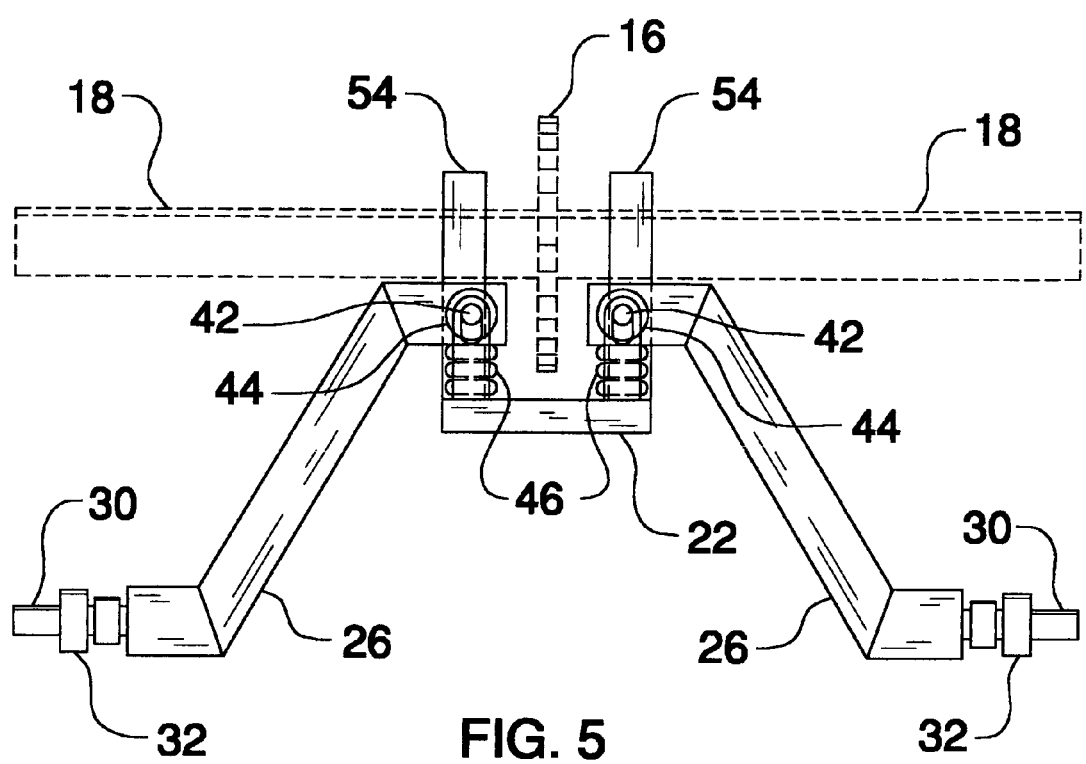
FIG. 5 is a front view of a preferred embodiment of the track drive undercarriage device of the present invention.

Referring now to FIG. 5 which depicts a is a front view of a preferred embodiment of the track drive undercarriage device 10 showing a drive gear 16, a drive shaft 18, a pair of support braces 54, a base plate 22, two shock absorbers 24, two axles 26, two spindles 30 and two wheel bearings 32. The drive shaft 18 is shown attached to the drive gear 16, wherein the drive shaft 18 is shown having two opposing ends. The pair of support braces 54 is shown mounted around the drive shaft 18. The base plate 22 is shown attached to the support braces 54. The two shock absorbers 24 are shown attached to the base plate 22. The two axles 26 are shown attached to the two shock absorbers 24, wherein each axle 26 is shown having a distal end and a proximate end, in which the proximate end of each axle 26 is shown attached to one of the two shock absorbers 24. The two spindles 30 are shown attached to the two axles 26, wherein each spindle 30 is shown attached to the distal end of one of the two axles 26. The two wheel bearings 32 are shown attached to the four spindles 30, in which each wheel bearing 32 is shown attached to one of the two spindles 30. Each shock absorber 24 is shown comprising: a horizontal cross bar 42, a horizontal spring 44, and a vertical spring 46.

As to the manner of usage and operation of the present invention, the same should be apparent from the above description. Accordingly, no further discussion relating to the manner of usage and operation will be provided.

While a preferred embodiment of the heavy construction work vehicle has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes" or variations, thereof, or the term "having" or variations, thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A track drive undercarriage device attached to a chassis of a heavy construction vehicle and operationally connected to a transmission and drive shaft of the construction vehicle, said device comprising:
   a pair of support braces attached to the construction vehicle;
   a base plate attached to said support braces;
   four shock absorbers attached to said base plate;
   four axles attached to said four shock absorbers, each axle having a distal end and a proximate end, the proximate end of each axle is attached to one of said four shock absorbers;
   a pair of torque bars attached to said four axles, each torque bar having two opposite ends, each opposite end of each torque bar is attached to the distal end of one of said four axles; and
   four spindles attached to said four axles, each spindle is attached to the distal end of one of said four axles;
   wherein each shock absorber comprising:
      a U-brace attached to said base plate;
      a horizontal cross bar attached to said U-brace;
      a pair of horizontal springs attached to said U-brace and attached to said horizontal cross bar; and
      a vertical spring attached to said U-brace and attached to said horizontal cross bar, wherein the proximate end of each axle is attached to said horizontal cross bar, said pair of horizontal springs and said vertical spring of one of said four shock absorbers.

* * * * *